United States Patent
Haepp

(10) Patent No.: US 7,524,116 B2
(45) Date of Patent: Apr. 28, 2009

(54) CAGE FOR TAPERED BALL BEARINGS

(75) Inventor: Alexander Haepp, Lendershausen (DE)

(73) Assignee: Schaeffler KG, Herzogenaurach (DE)

( * ) Notice: Subject to any disclaimer, the term of this patent is extended or adjusted under 35 U.S.C. 154(b) by 332 days.

(21) Appl. No.: 10/599,073

(22) PCT Filed: Mar. 18, 2005

(86) PCT No.: PCT/DE2005/000516

§ 371 (c)(1),
(2), (4) Date: Sep. 19, 2006

(87) PCT Pub. No.: WO2005/090810

PCT Pub. Date: Sep. 29, 2005

(65) Prior Publication Data

US 2007/0196038 A1    Aug. 23, 2007

(30) Foreign Application Priority Data

Mar. 20, 2004  (DE) .................. 10 2004 013 804

(51) Int. Cl.
*F16C 33/38* (2006.01)
(52) U.S. Cl. .................... 384/523; 384/526
(58) Field of Classification Search ........... 384/470, 384/490, 523, 526, 528, 534
See application file for complete search history.

(56) References Cited

U.S. PATENT DOCUMENTS

| | | | | |
|---|---|---|---|---|
| 3,975,066 A * | 8/1976 | Hofmann et al. | ............ | 384/526 |
| 4,330,160 A * | 5/1982 | Stolz et al. | .................. | 384/531 |
| 4,398,775 A * | 8/1983 | Hofmann et al. | ............ | 384/484 |
| 4,560,291 A * | 12/1985 | Bonengel et al. | ............ | 384/533 |
| 4,723,851 A * | 2/1988 | Troster et al. | ................ | 384/523 |
| 4,804,276 A * | 2/1989 | Olschewski et al. | ......... | 384/526 |
| 5,906,441 A * | 5/1999 | Seki | ........................... | 384/528 |
| 6,397,471 B1 * | 6/2002 | Okuno | .................. | 29/898.064 |
| 6,447,169 B2 * | 9/2002 | Chambert | .................... | 384/523 |
| 6,783,279 B2 * | 8/2004 | Wilm et al. | ................. | 384/470 |
| 7,033,082 B2 * | 4/2006 | Yakura et al. | ............... | 384/528 |
| 7,059,777 B2 * | 6/2006 | Kawaguchi et al. | ......... | 384/523 |
| 2001/0036329 A1 | 11/2001 | Chambert | | |

FOREIGN PATENT DOCUMENTS

DE  39 17 128 Y  11/1990
DE  94 12 260 A  9/1994

* cited by examiner

*Primary Examiner*—Marcus Charles

(57) ABSTRACT

The invention relates to a cage for tapered ball bearings. Said cage comprises adjacent ball bearing pockets that are arranged over the periphery about a rotational axis of the cage, in addition to elastically deformable retaining lugs that are located on one of the lateral walls. In said cage, the flanks of the retaining lugs run obliquely in relation to one another.

14 Claims, 3 Drawing Sheets

CAGE FOR TAPERED BALL BEARINGS

FIELD OF THE INVENTION

The present invention relates to a cage for tapered ball bearings having ball pockets which are adjacent to one another on the circumferential side about a rotational axis of the cage, the ball pockets being delimited on the circumferential side by webs.

BACKGROUND OF THE INVENTION

A cage of this type is described in DE 3706013 A1. Cages of this type are manufactured from plastic. Typical examples of materials which are used for the manufacture of cages of this type are polyamides which are reinforced with glass or with carbon fibers (for example, PA66/GF). The cage has two side rings which are connected to one another by webs. One of the side rings is arranged on one side of the cage above the pitch circle and another of the side rings is arranged below the pitch circle. The side rings on cages of the generic type are also known as side rims. The side rims of the cage are provided with annular grooves, starting from the end sides.

Cages of the type under consideration are particularly difficult to design if they additionally have retaining lugs. Said retaining lugs are formed as a rule on one of the side rims and engage into a corresponding circumferential groove of one of the bearing rings of the tapered ball bearing. The cages, together with the balls and the corresponding bearing ring, are preassembled via the retaining lugs to form a self-contained structural unit, from which balls cannot fall during assembly in the other bearing ring of the tapered ball bearing. Retaining lugs of this type are also provided for axial path limitation of the cage in a bearing.

During assembly of the cage on the bearing ring, the retaining lugs are either compressed or extended elastically until the retaining lugs snap into a corresponding groove of the bearing ring. The wall thicknesses in the region of the transition of the retaining lugs into the cage therefore have to be of sufficiently stable dimensions, in order not to be deformed plastically permanently during assembly of the cage on or in the bearing ring. On the other hand, the retaining lugs have to be elastic enough, in order not to make assembly of the cage in the bearing difficult and in order to prevent damage to the cage or the retaining lugs. Therefore cages, the rims of which have relatively large cross sections, are normally advantageous for the stability of the cage. However, the assembly forces for pushing them, for example, onto an inner ring and expanding the retaining lugs in the process are relatively high. Moreover, the retaining lugs are easy to damage on account of the high assembly forces.

According to DE 3706013 A1, the annular grooves are provided in the side rims, in order to configure the wall thicknesses of the rims to be as thin as possible and in order to achieve uniform wall thickness in all regions of the side rims. Uniform wall thicknesses and wall thickness transitions are aimed for during injection molding of plastic parts, in order to avoid interruptions of the material flow/bubbles of the cage material in the cavities of the injection molding dies at the transition from thick to thin cross sections. Moreover, identical cooling speeds are achieved in all regions of the workpiece as a result of uniform wall thicknesses. Faults from undesired weakening in thin wall regions are also avoided by flow paths in cavities which are as short as possible with a relatively small injection cross section.

The thin-walled configuration is subject to limitations as a result of the requirements for high operating strength of the cage. If the cross sections of cages of this type are too small, it is to be feared that the cages with the retaining lugs which are mentioned in the beginning break during assembly of the bearing or exhibit permanent deformations. Incidentally, thin-walled plastic parts are extremely unstable after removal from the die and frequently lose their intended shape or geometry during subsequent cooling and during storage.

SUMMARY OF THE INVENTION

It is therefore the object of the invention to provide a cage which meets the above-mentioned and partially contradictory requirements of manufacturability, of inexpensive manufacture and of function in an optimum manner.

This object is achieved according to the subject matter of claim 1. The ball pockets of this cage are delimited on the circumferential side by webs which are oriented at least transversely with respect to the circumferential direction of the cage and in each case by a side wall with an approximately uniform wall thickness in at least one axial direction of the cage. Each of the side walls connects two webs, which lie opposite one another, to one another, on the circumferential side.

The invention provides a cage for tapered ball bearings having retaining lugs which are designed in a sprung resilient manner. The retaining lugs are provided for axially securing the cage in a retaining groove of the inner ring or the outer ring. Each of the retaining lugs protrudes from one of the side walls and is adjacent on the circumferential side to further retaining lugs. The retaining lugs preferably protrude initially radially from the side walls, and then point obliquely in the direction of the rotational axis.

Each of the retaining lugs is separated on the circumferential side from a further retaining lug by a circumferential gap. The flanks on the retaining lugs which face the circumferential gap and lie opposite one another at the circumferential gaps extend in an inclined manner with respect to one another. The cross section of the retaining lugs is reduced overall and therefore the retaining lugs are inherently more elastic. The assembly is simplified. Side walls, webs, etc. can be of thin-walled design for reasons of material economy.

One embodiment of the invention provides for the flanks which face one another on the circumferential side to extend rectilinearly and at the same time to be inclined at an angle with respect to an imaginary plane which is aligned with the rotational axis. The flanks are optionally flat surfaces or straight lines which face the circumferential gap, the surfaces being inclined at an angle of 30° with respect to an imaginary plane which is aligned with the rotational axis. The flanks are preferably inclined with respect to one another in such a way that the circumferential spacing between flanks, which face one another at a circumferential gap, of adjacent retaining lugs increases in the direction of the rotational axis.

In a further embodiment of the invention, the transition of the retaining lugs to the side walls is of elastic design. To this end, a groove is made in the material of the cage in each case at the transition from the side wall to the retaining lug. The groove is oriented on the circumferential side or tangentially with respect to the rotational axis. The wall thickness of the side wall is reduced by the groove which is open in the axial direction. Whereas, the cross section of the groove in a longitudinal section of the cage along the rotational axis is described by a radius. The groove provides an elastic predetermined bending point between the cage and the retaining lug which makes assembly easier and protects the cage from damage.

As a result of the design of the retaining lugs and their transition into the side walls according to the invention, the cage can be optimized during manufacture with regard to material usage. The side walls are therefore preferably arched at least in the axial direction, starting from the webs, and protrude here in the axial direction from the webs. The outer contours of the side walls of pockets which follow one another on the circumferential side are removed freely from one another on the circumferential side increasingly with increasing spacing from the web in the axial direction, with the result that the cage is provided at least on the end side with gaps which extend partially between the pockets in the direction of the webs. The axially protruding cusp of the arches protrudes axially the furthest from the cage in the axial direction.

In each case one rib emanates in the axial direction from in each case one of the webs and connects two of the side walls of pockets which follow one another on the circumferential side to one another. Each of the ribs protrudes from the web in the axial direction at most to the extent that the side walls protrude at most in the axial direction starting from the web, but not further.

At least one of the relatively thick-walled side rims which are usually formed on both sides of cages of the generic type is omitted on the cage according to the invention. Instead, the cage is provided, on at least one end side between the arched side walls of the pockets, in each case with a rib which is oriented circumferentially or tangentially between the individual pockets which follow one another. Less material is used for the manufacture of the cage and the functional strength is ensured via the composite structure of ribs and side walls.

Ribs, which are oriented on the circumferential side, between the side walls are preferably curved in such a way that all arbitrary points of a rib face which faces the rotational axis are spaced apart radially to the same extent from the rotational axis of the cage. As a result of the axially outwardly arched side walls, the rib face is widened in the circumferential direction with increasing axial spacing from the respective web. Each of the gaps is preferably delimited radially toward the rotational axis by one of the ribs. The ribs merge axially into the web in such a way that the greatest radial spacing of the ribs from the rotational axis is at most equally as large as the smallest radial spacing of each of the webs from the rotational axis.

The cage optionally has a side rim which delimits the pockets in the opposite direction to the end side, on which the ribs are formed, or is designed on both end sides according to the invention. As, in cages for tapered ball bearings of the generic type, one of the side rims usually extends radially below the pitch circle of the balls and one of the side rims usually extends radially above the pitch circle of the balls, the result for the cage according to the invention is that the smallest radial spacing of the side rim from the rotational axis of the cage is greater than the greatest radial spacing of the side walls from the rotational axis.

Further refinements of the invention are described in the section "Detailed Description of the Drawings".

BRIEF DESCRIPTION OF THE DRAWINGS

In the following text, the invention will be described in greater detail using an exemplary embodiment. In the drawings, in detail.

DETAILED DESCRIPTION OF THE DRAWINGS

Figure 1:
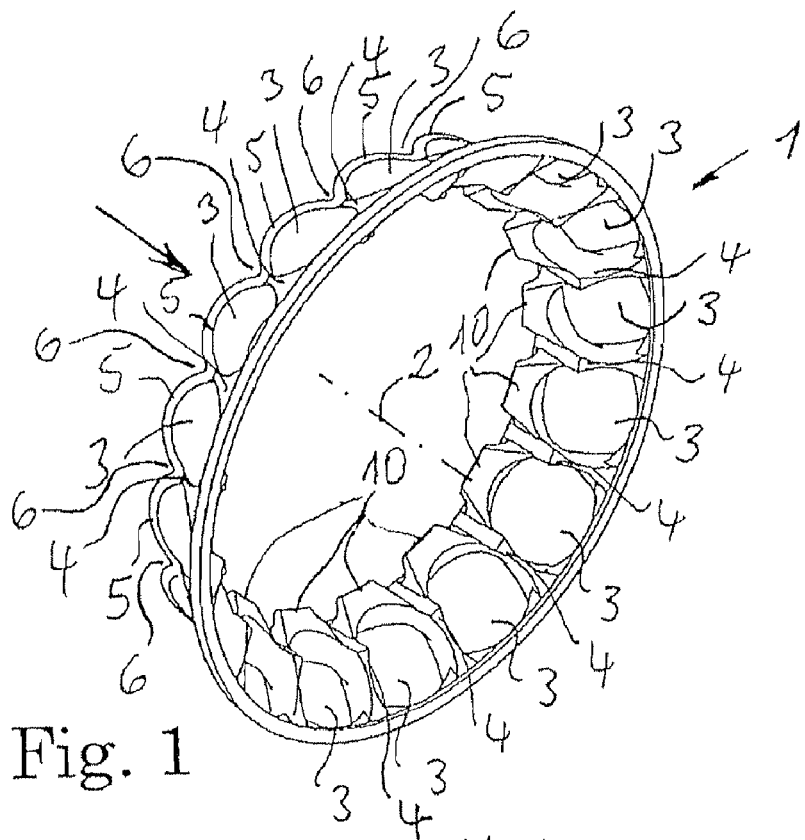
FIG. 1 shows the overall view of an exemplary embodiment of a cage according to the invention.
Figure 2:
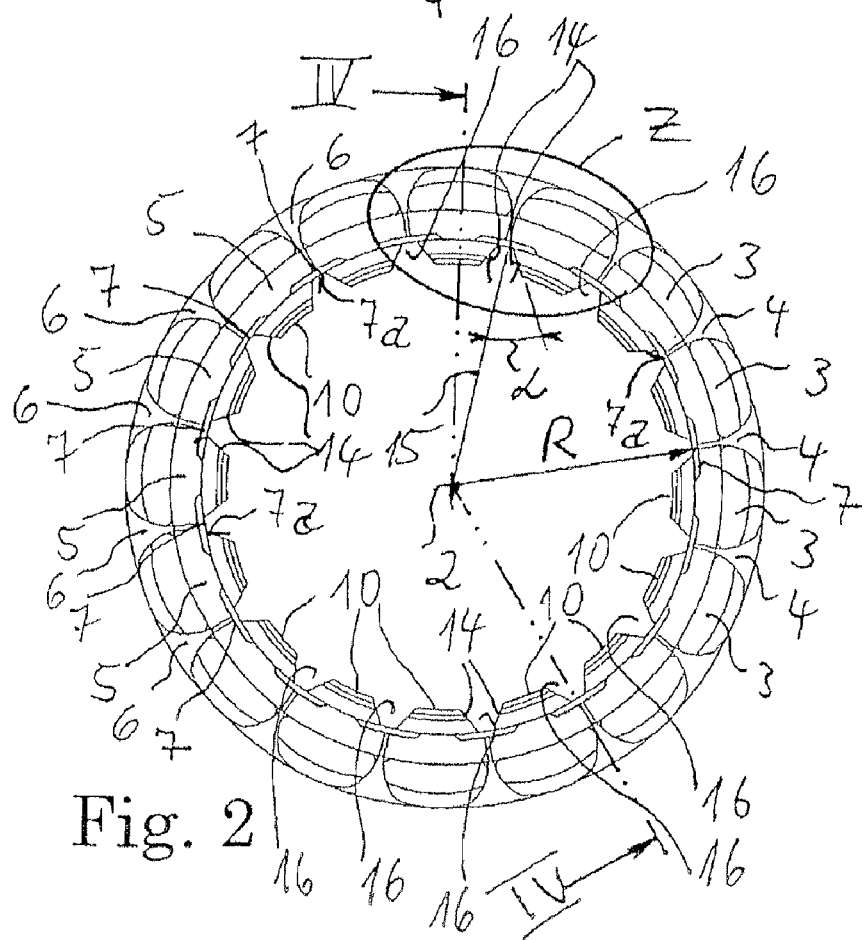
FIG. 2 shows the front view of the cage from FIG. 1 in the direction of the arrow.
Figure 3:
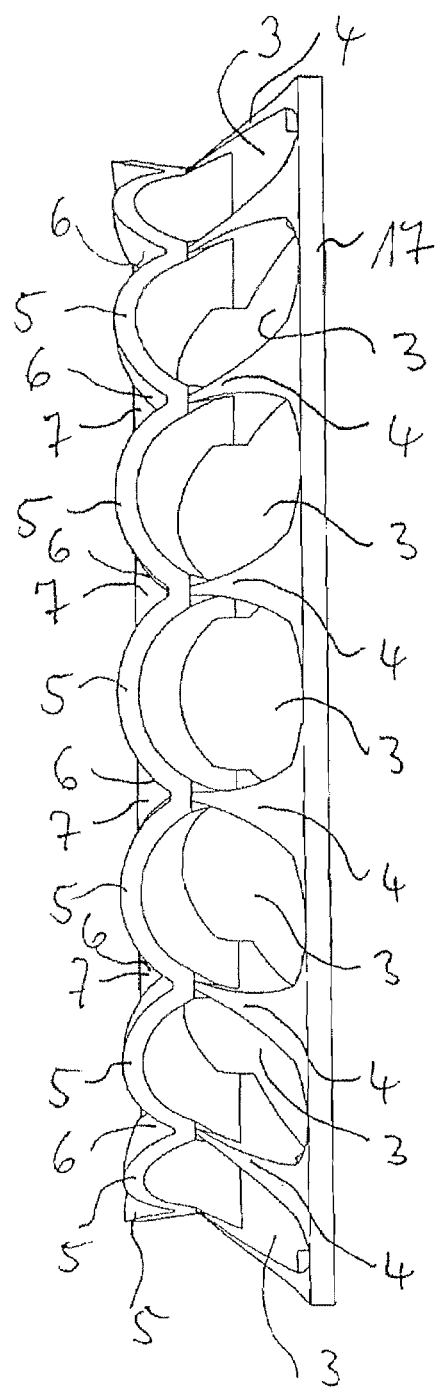
FIG. 3 shows a side view of the cage.
Figure 5:
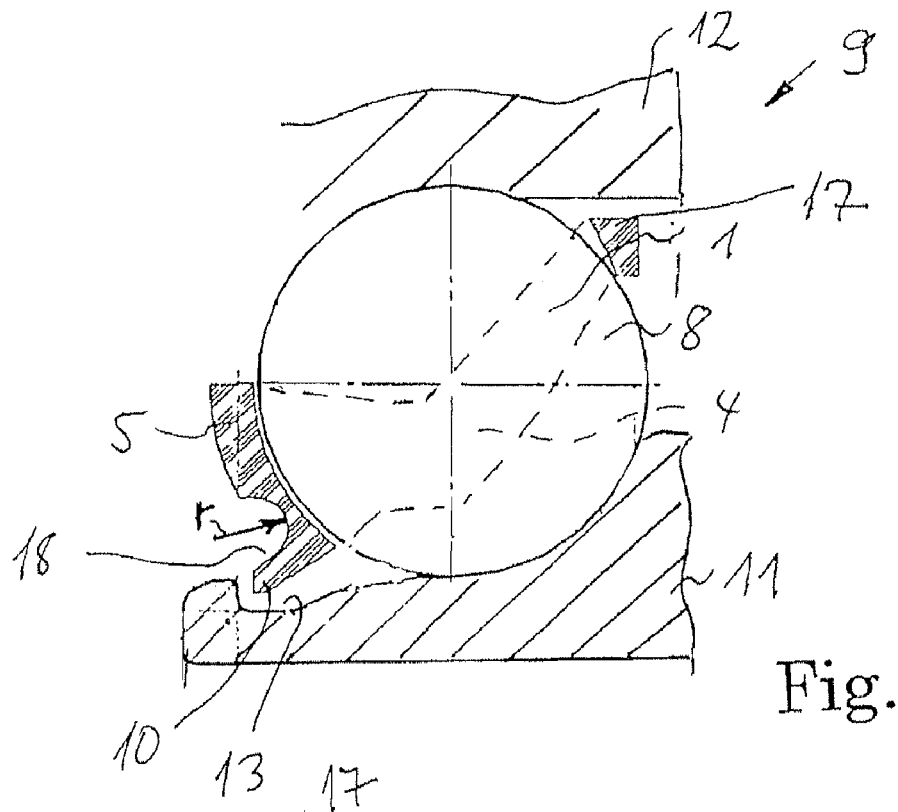
FIG. 5 shows a partial view of a tapered ball bearing having the cage according to FIG. 1, illustrated in longitudinal section.

FIGS. 1 to 3 show an exemplary embodiment of a cage 1 according to the invention. The cage has ball pockets 3 which are adjacent on the circumferential side about its rotational axis 2 with respect to one another with a uniform pitch. A ball 8 is guided in each individual ball pocket 3. FIG. 5, a sectional partial view of a tapered ball bearing 9, shows the cage 1 which is arranged radially between an inner ring 11 and an outer ring 12 with balls 8. The ball pockets 3 are delimited by webs 4 which extend transversely with respect to the circumferential direction. On one end side, the cage 1 is delimited by side walls 5 having an approximately uniform wall thickness.

Figure 6:
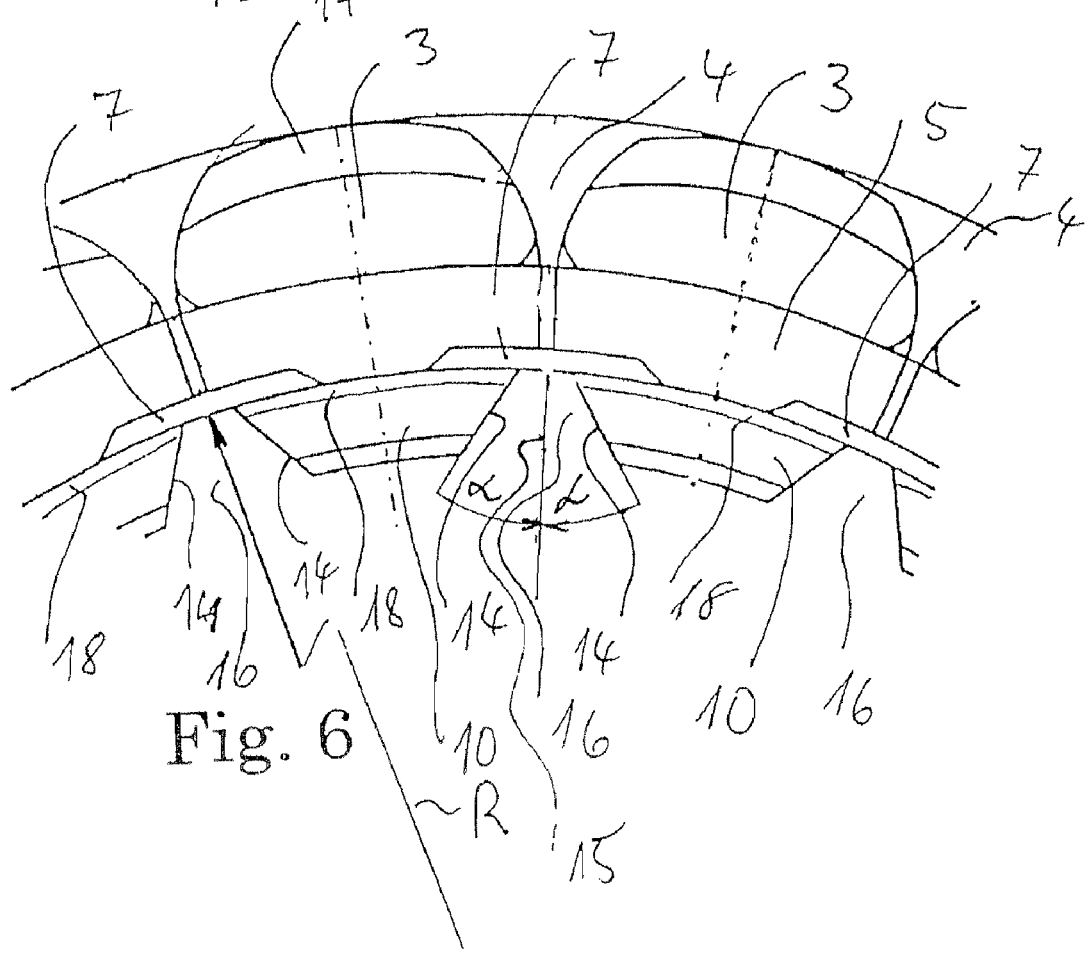
FIG. 6 shows the detail Z from FIG. 2 in a much enlarged illustration.

The side walls 5 are arched from the webs 4 in the axial direction, with the result that axial gaps 6 are formed on the end side of the cage 1. The gaps 6 are delimited in the radial direction of the rotational axis 2 by in each case one rib 7. The ribs 7 are oriented in the circumferential direction and extend in a curved manner in the circumferential directions (FIGS. 2 and 6). Whereas the curvatures of the ribs 7 are described by a common radius R which emanates from the rotational axis 2. All arbitrary points of the rib face 7a which faces the rotational axis 2 are spaced apart from the rotational axis 2 by the radius R and propagate in the axial direction from the webs 4. As can be seen from FIG. 3, each of the ribs 7 does not protrude in the axial direction from the respective web 4 as far as the side walls 5 protrude axially from the cage 1 in the axial direction from the web 4.

The cage 1 has retaining lugs 10 which are resilient in a sprung manner. The retaining lugs 10 engage radially into an annular groove 13 of the inner ring 11. The cage 1 is secured axially with play on the inner ring 11 by means of the retaining lugs 10. Flanks 14, which face in the circumferential direction, on the retaining lugs 10 extend in an inclined manner with respect to one another (FIG. 2, and FIG. 6). In this case, the flanks 14 are inclined with respect to one another in such a way that the spacing of the retaining lugs 10 which are spaced apart in each case with respect to one another by a circumferential gap 16 increases in the direction of the rotational axis 2. The flanks 14, preferably flat surfaces or straight edges, are inclined by an angle $\alpha$ with respect to an imaginary plane 15 which is aligned with the rotational axis 2. $\alpha$ preferably has a value of 30°.

The thickness of the side walls is reduced by a groove 18 between each of the side walls 5 and one of the retaining lugs 10. In the longitudinal section according to FIG. 5, the groove 18 is described by a radius r. Each of the grooves 18 is delimited radially to the outside proportionately by one of the side walls 5 and by two of the ribs 7 which are separated from one another in the circumferential direction by one of the side walls 5 (FIG. 6). Grooves 18, which are adjacent to one another in the circumferential direction are delimited in pairs, radially to the outside, jointly by at least one of the ribs 7. The retaining lugs 10 do not protrude in the axial direction as far as the side walls 5 are arched from the webs 4 in the axial direction.

Figure 4:
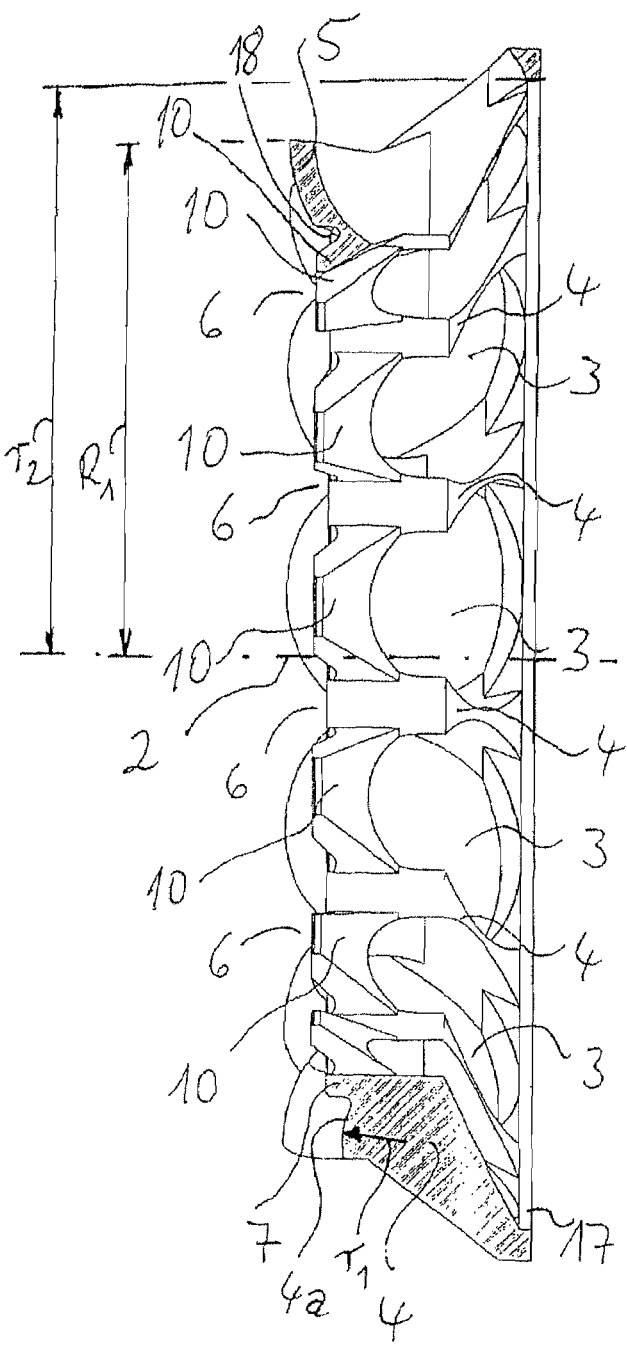
FIG. 4 shows a longitudinal section through the cage along the line IV-IV according to FIG. 2.

The ball pockets 3 are delimited in the opposite direction to the side walls 5 by means of a side rim 17. The cross section of the side rim 17 in axial directions is approximately adapted to the thickness of the side walls 5 (FIG. 5). As can be seen from FIG. 4, the webs extend from the side rim 17 initially in an inclined manner in the direction of the rotational axis 2 and then extend in the axial direction. The end side 4a of the webs 4 in the gaps 6 and over the ribs 7 is described by a radius $r_1$. The smallest radial spacing, which is described by the radius $r_2$, of the side rim 17 from the rotational axis is greater than the greatest radial spacing, which is described by the radius $R_1$, of the side walls 5 from the rotational axis.

LIST OF DESIGNATIONS

1 Cage
2 Rotational axis
3 Ball pocket
4 Web
4a End side
5 Side wall
6 Gap
7 Rib
7a Rib face
8 Ball
9 Tapered ball bearing
10 Retaining lug
11 Inner ring
12 Outer ring
13 Annular groove
14 Flanks
15 Plane
16 Circumferential gap
17 Side rim
18 Groove

The invention claimed is:

1. A cage for tapered bail bearings comprising: a cage having ball pockets which are adjacent to one another on the circumferential side about a rotational axis of the cage, wherein:
the ball pockets are delimited on the circumferential side by webs,
the cage has retaining lugs which are elastically resilient for axially securing the cage in an annular groove of an inner ring, each of the retaining lugs protruding from one of the side walls,
circumferentially spaced apart flanks on the retaining lugs extend in an inclined manner with respect to one another, and wherein the circumferential spacing between the flanks, which face one another across a circumferential gap between adjacent retaining lugs, increases in the direction of the rotational axis.

2. The cage of claim 1, wherein the flanks which face one another on the circumferential side are inclined with respect to an imaginary plane which emanates from the rotational axis and is aligned with the rotational axis.

3. The cage of claim 1, wherein the flanks are flat surfaces which face the circumferential gap, the surfaces being inclined at an angle of 30° with respect to an imaginary plane which emanates from the rotational axis and is aligned with the rotational axis.

4. The cage of claim 1, wherein the ball pockets are delimited in at least one axial direction of the cage in each case by a side wall having an approximately uniform wall thickness.

5. The cage of claim 4, wherein the side walls are arched, starting from the webs, at least in the axial direction and gaps are therefore formed between the side walls which protrude beyond the web and are adjacent on the circumferential side.

6. The cage of claim 5, wherein the retaining lugs protrude in the axial direction at most to the extent that the side walls protrude at most in the axial direction starting from the web.

7. The cage of claim 5, further comprising grooves, the wall thickness of the side walls being reduced by in each case one of the grooves and each of the grooves being delimited in the direction of the rotational axis by one of the retaining lugs and, on the side of the ball pockets, by one of the side walls.

8. The cage of claim 7, wherein the groove, as viewed in a longitudinal section along the rotational axis of the cage, is described by a radius.

9. The cage of claim 1, further comprising a side rim which runs on the circumferential side, the side rim delimiting the ball pockets in the opposite direction to the axial direction.

10. The cage of claim 9, wherein the smallest radial spacing of the side rim from the rotational axis of the cage is greater than the greatest radial spacing of the side walls from the rotational axis.

11. A cage for tapered ball bearings comprising: a cage having ball pockets which are adjacent to one another on the circumferential side about a rotational axis of the cage, wherein:
the ball pockets are delimited on the circumferential side by webs,
the ball pockets are delimited in at least one axial direction of the cage in each case by a side wall having an approximately uniform wall thickness, wherein the side walls are arched, starting from the webs, at least in the axial direction and gaps are therefore formed between the side walls which protrude beyond the web and are adjacent on the circumferential side,
the cage has retaining lugs which are elastically resilient for axially securing the cage in an annular groove of an inner ring, each of the retaining lugs protruding from one of the side walls,
circumferential flanks on the retaining lugs extend in an inclined manner with respect to one another, and
further comprising ribs in the circumferential direction between two side walls, each of the ribs emanating in the axial direction from in each case one of the webs and connecting in each case two of the side walls to one another on the circumferential side.

12. The cage of claim 11, wherein each of the grooves is delimited radially to the outside proportionately by one of the side walls and by two of the ribs which are separated from one another in the circumferential direction by means of one of the side walls.

13. The cage of claim 11, wherein the grooves are delimited partially in pairs, radially to the outside, jointly by at least one of the ribs.

14. The cage of claim 11, wherein each of the circumferential gaps is delimited partially radially to the outside by one of the webs and by one of the ribs.

* * * * *